Sept. 14, 1926.

W. N. JOHN

JAWS FOR HOLDING ARTICLES

Filed Feb. 16, 1925  2 Sheets-Sheet 1

1,599,895

Inventor:
William N. John

Sept. 14, 1926.
W. N. JOHN
1,599,895
JAWS FOR HOLDING ARTICLES
Filed Feb. 16, 1925   2 Sheets-Sheet 2
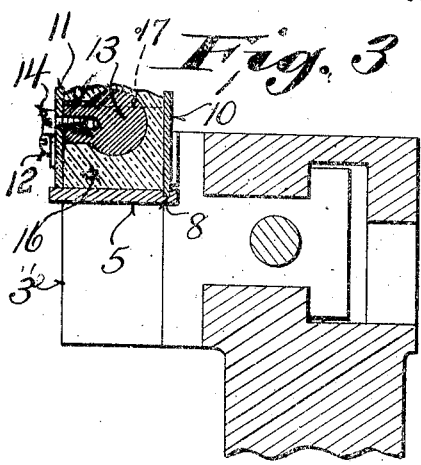
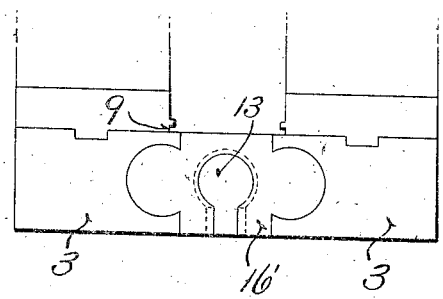
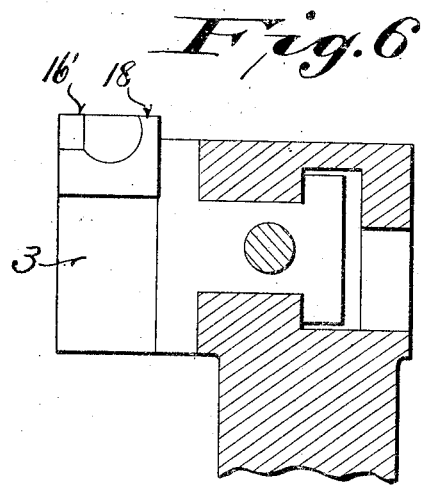
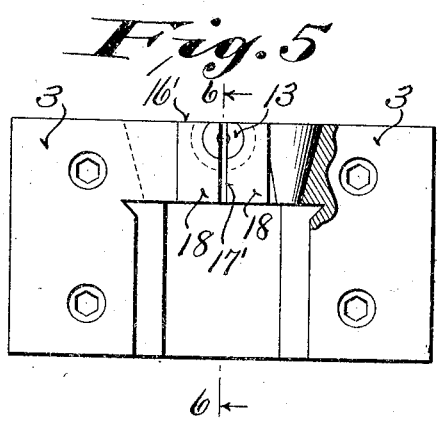

Patented Sept. 14, 1926.

1,599,895

UNITED STATES PATENT OFFICE.

WILLIAM N. JOHN, OF MILWAUKEE, WISCONSIN.

JAWS FOR HOLDING ARTICLES.

Application filed February 16, 1925. Serial No. 9,577.

This invention relates to a method of making jaws for holding articles and to the resulting apparatus.

In machine shop work, it is frequently the case that a number of similar articles of odd shape have to be temporarily held within chucks or other members, so that they may be machined and worked upon. As is well known, the usual practise is to provide jigs and other complicated devices in an attempt to accurately position the article, but these jigs and similar devices are not only expensive and difficult to make, but do not fulfill the purpose for which they were intended with the necessary accuracy and certainty.

This invention is designed to overcome the above noted defects, and objects of such invention are to provide a method of making jaws for holding articles of any desired shape so that the articles may be accurately and securely held for machining or work thereon, and may be quickly removed from these accurately fitting jaws.

Further objects are to provide a method of casting jaws for chucks for holding articles of any desired shape so that one of the articles may act as a pattern in the forming of the jaws and the jaws may accurately conform to the article and, therefore, securely grip the article within the chuck.

Further objects are to provide a method of casting soft metal jaws for articles of any desired shape, such method contemplating the casting of the jaws within the chuck itself while the article is positioned in spaced relation to the chuck and between the jaws thereof, such method further contemplating subsequently splitting the casting by cutting through the article and the casting to thus permit the removal of the article from the cast, accurately fitting jaws and the subsequent rapid use of the jaws for holding other articles of this shape.

Further objects are to provide a method of casting jaws for chucks for holding articles in which the cast jaws accurately conform both to the article and the chuck and are rigidly carried by the chuck, and in which reenforcing means are provided for the soft metal jaws.

An embodiment of the invention is shown in the accompanying drawings, in which:—

Figure 3 is a sectional view on the line 3—3 of Figure 2.

Figure 4 shows the casting after it has received its first machining operation.

Figure 5 is an elevation of the structure shown in Figure 4, showing, however, the next step in the formation of these jaws.

Figure 6 is a sectional view on the line 6—6 of Figure 5 with the article removed from the jaws.

Figure 7 is a plan view of the base plate or supporting plate.

In practising this invention any suitable type of chuck or member of this general nature may be employed. For the purpose of illustration, a vice chuck has been shown, as illustrated particularly in Figures 1 and 2. It will be seen that this vice chuck comprises a pair of members 1 which may be moved towards and from each other by the hand wheel or other portion 2 in the usual manner. These members 1 are provided with jaws 3 securely attached thereto and adapted to transmit great clamping stress without any shifting. Tapered and rounded keyways 4 are formed in the opposite surfaces of the jaws 3, as clearly shown in Figure 1. Preferably, the rear walls of these keyways converge, as shown in Figure 2.

Figure 2:
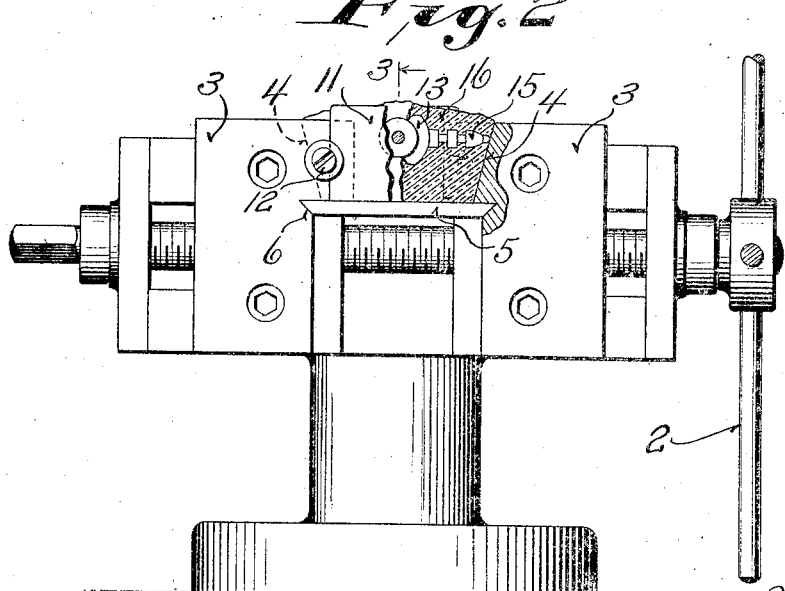
Figure 2 is an elevation of the structure shown in Figure 1 with the casting formed and with parts broken away to illustrate the interior construction.

A base plate or supporting plate 5 is provided with beveled ends 6 which fit correspondingly bevelled grooves in the jaws 3, as shown most clearly in Figure 2. This base plate, as may be seen from Figure 7, is provided with a rearward extension 7 which is grooved, as indicated at 8.

Further, it is to be noted that the members 1 are preferably provided with grooves or similar portions 9 which, together with the groove in the projecting portion 7 in the supporting plate 5 are adapted to receive a rear wall plate or a dam plate 10 for a purpose hereinafter to appear. A front plate 11 is attached in any suitable manner, as by means of the screws 12 to the front face of the chuck. For instance, the plate 11 may fit between the screws 12 and may be gripped beneath washers carried by such screws shown in Figures 1 and 2 in order to hold such plate in position. This plate also acts as a dam for the molding material during the casting operation.

Figure 1:
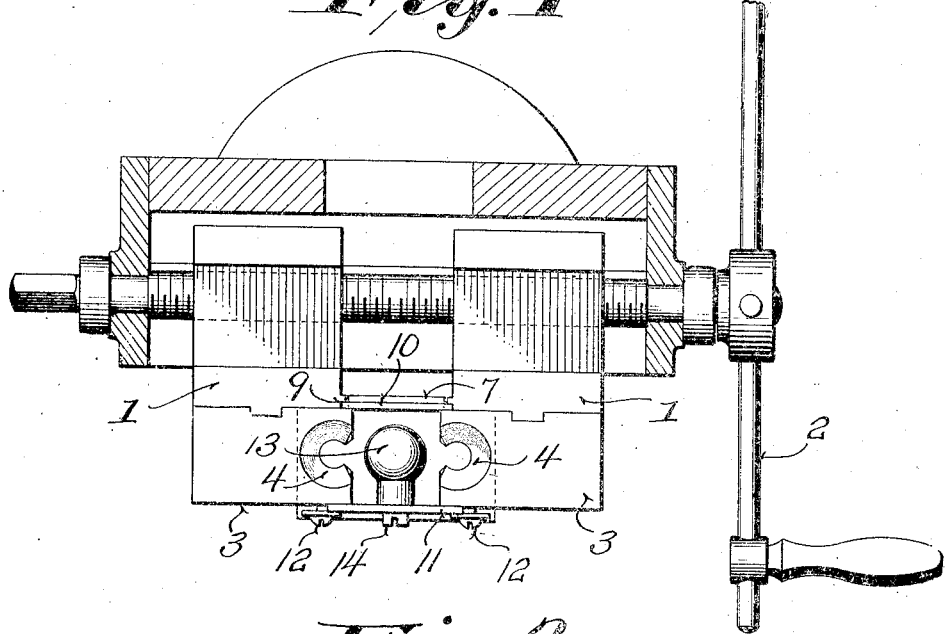
Figure 1 is a plan view partly in section of a vice or chuck showing the article positioned therein ready for the casting operation.

Any desired regularly or irregularly shaped article may be operated upon. For example, one of the group of articles to be held by the subsequently formed jaws is supported in any suitable manner between the jaws 3, as shown in Figure 1. A very convenient manner of attaching the article, such as indicated by the reference character 13, is to secure a portion of the article to the front plate 11 by means of a screw or similar fastening member 14. Shouldered reinforcing pins 15 are positioned on opposite sides of the article, as illustrated in Figure 2, and in contact with both the jaw face and the article. Preferably, at least two of these pins are employed and extend from opposite jaws 3 to the article.

When the parts are in the position just described, the desired soft metal for forming the jaws is cast around the article and around the reenforcing pins and between such article and the jaws, the casting being illustrated by reference character 16 in Figure 2. It is preferable in forming this casting to allow it to slightly build up, as illustrated in Figure 2. The sectional view shown in Figure 3 shows the relative positions of the parts and the casting with reference to the article 13.

The next step in the process of making these jaws is to machine across the top of the casting and across the article down to the dotted line 17, as shown in Figure 3, it being understood that the plates 10 and 11 may be removed to facilitate this operation. The casting then appears, as shown at 16′ in Figure 4, and it is to be noted from reference to Figures 2, 4 and 5 that a convenient and satisfactory way of machining the casting is to remove it to a point where it is flush with the upper face of the jaws 3.

The next step in the process is to cut through the article and the jaws. For example a saw cut, as indicated at 17′ in Figure 5, is made directly through the partially machined casting 16′ and the article, preferably the supporting plate 5 is removed during this operation. This forms two definite jaws, as indicated by reference characters 18.

As shown in Figure 6, these jaws have the exact contour of the article, the severed portions of such article being removed in the view in Figure 6. Thus the remaining articles may be quickly gripped in a secure and firm manner between the jaws 18 and held accurately in place for machining or other work thereon.

It is apparent from this disclosure that any regular or irregular article may be held firmly and without bruising or damaging between the jaws formed in accordance with this method, and that the jaws are provided with portions which securely engage the article held thereby through a large portion of the extent of the article, and thus prevent shifting or turning of the article during subsequent work thereon.

Further, it will be seen that the jaws 18 are securely keyed or fastened to the jaws 3, and that no attention of the operator is, thereafter required, the jaws 16 acting as a unitary part of the chuck.

It is to be particularly noted that one of the articles is itself employed as a pattern in forming these cast jaws and that, therefore, extensive machine work is not required in making these jaws but that they may be very simply and quickly made by ordinary machine shop practices.

Although the invention has been described in considerable detail, it is to be understood that the invention may be variously embodied and is, therefore, to be limited only as claimed.

I claim:

1. In a device of the class described, the combination of a pair of movable jaws adapted to retain an article between them, soft metal members secured to said jaws and conforming accurately to the contour of the article, and reenforcing pins carried within the soft metal jaws and adapted to contact at opposite ends with the article and with said jaws, respectively.

2. In a device of the class described, the combination of a pair of movable jaws adapted to retain an article between them, soft metal members secured to said jaws and conforming accurately to the contour of the article, and reenforcing pins carried within the soft metal jaws and adapted to contact at opposite ends with the article and with said jaws, respectively.

3. In a device of the class described, the combination of a pair of movable jaws adapted to retain an article between them, soft metal members secured to said jaws and conforming accurately to the contour of the article, and reenforcing pins carried within the soft metal jaws and adapted to contact at opposite ends with the article and with said jaws, respectively, said reenforcing pins having interlocking engagement with said soft metal jaws.

In testimony that I claim the foregoing I have hereunto set my hand at Milwaukee, in the county of Milwaukee and State of Wisconsin.

WILLIAM N. JOHN.